July 23, 1946.  O. C. MARTIN  2,404,448

MATRIX FOR MAKING LIGHT TRANSMITTING SCREENS

Original Filed June 28, 1939  2 Sheets-Sheet 1

OTIS C. MARTIN,
INVENTOR

BY
ATTORNEY.

July 23, 1946.  O. C. MARTIN  2,404,448
MATRIX FOR MAKING LIGHT TRANSMITTING SCREENS
Original Filed June 28, 1939    2 Sheets-Sheet 2
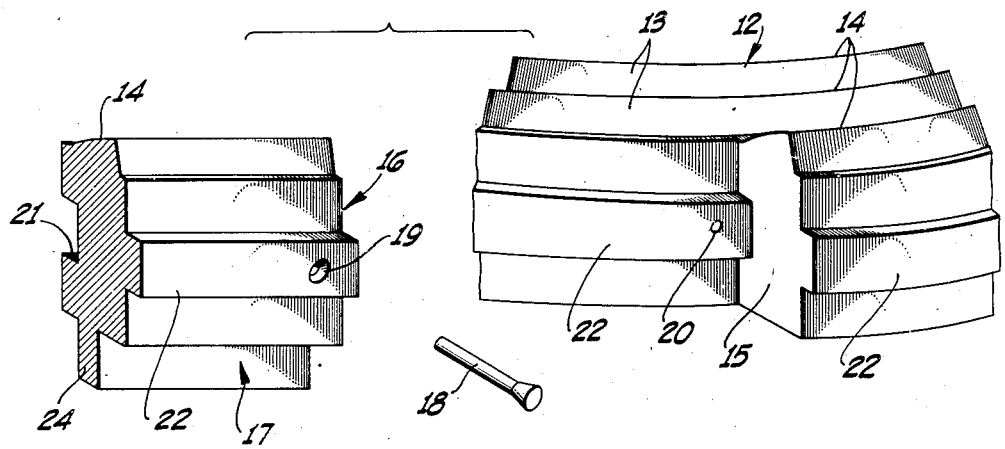
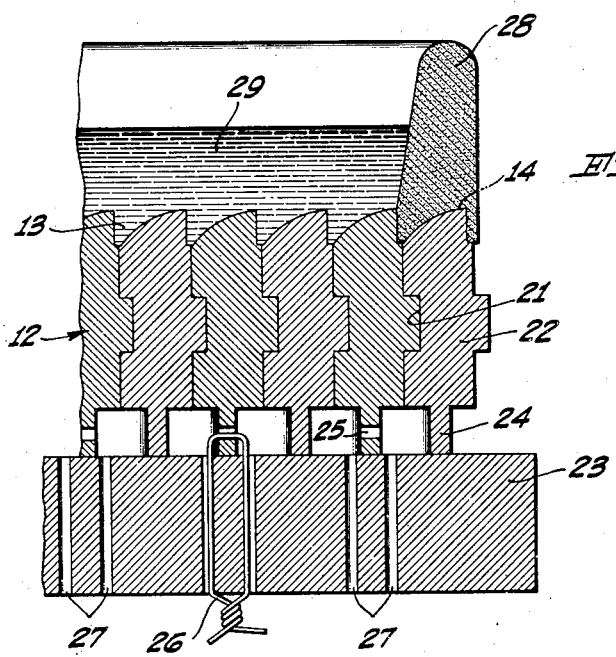
OTIS C. MARTIN,
INVENTOR Patented July 23, 1946

2,404,448

UNITED STATES PATENT OFFICE 2,404,448

MATRIX FOR MAKING LIGHT TRANSMITTING SCREENS

Otis C. Martin, Los Angeles, Calif.; Marion E. Martin administratrix of said Otis C. Martin, deceased Original application June 28, 1939, Serial No. 281,625. Divided and this application March 16, 1942, Serial No. 434,810

2 Claims. (Cl. 18—34)

My invention relates to a matrix for making projection screens which finds particular utility when employed for re-photographing motion pictures.

This application is a division of my copending application Serial No. 281,625, filed June 28, 1939, now Patent No. 2,315,721, and entitled "Matrix element for making light transmitting screens."

One of the most common uses of light transmitting screens for rephotography of motion pictures is in connection with the process known to the motion picture industry as "back projection." Back projection consists in projecting a motion picture of a landscape, street scene, or other background material upon a translucent projection screen. Actors participating in the enactment of a motion picture being filmed are positioned before this screen and the actors and the screen are photographed simultaneously so that the completed photograph portrays the actors in the environment which is "back projected" on the translucent screen.

Considerable difficulty has been encountered in the use of this process as regards the obtaining of the required uniformity of illumination throughout the entire surface of the translucent screen when viewed from the location of the camera lens. The use of a cloth screen for this process is unsatisfactory in that the cloth absorbs too much light and prevents adequate exposure of the film used in the rephotographing camera. As a result, ground glass has been used in the past but has not been satisfactory due to the fact that the ground glass, while tending to diffuse the light transmitted through it, tends nevertheless to transmit the greater proportion of the light in the same general direction as was followed by the light striking the screen. The screen, therefore, when viewed from the location of the camera lens displayed a very bright central area, becoming increasingly darker as the edge of the screen was approached.

The use of "Lucite" (a transparent plastic material having a high light transmitting efficiency and a relatively high index of refraction) has resulted in the manufacture of extremely satisfactory screens in the smaller sizes, not exceeding six feet in either width or height. These smaller screens usually either incorporate a great number of individual lens elements for redirecting the light as it is passed through the transparent screen or are made in the form of a plane Fresnel lens, the individual prismatic faces of which are formed by cutting a continuous scroll or spiral groove of the requisite cross section in the front face of a sheet of "Lucite."

Screens employed for the "back projection" process oftentimes are required to have a size as large as 30 x 40 feet and until the present invention it has been impossible to construct a screen of this size of "Lucite" which employs the desired optical principles which are incorporated in the smaller sized screens.

It is an object of my invention to provide a novel matrix upon which liquid "Lucite" may be cast to provide a light transmitting screen of any desired size having formed integrally therewith a means for redirecting the light which is passed therethrough.

It is also an object of my invention to provide a matrix of the character set forth in the preceding paragraph which includes means for defining a continuous spiral groove of any selected cross section in the "Lucite" which may be cast thereupon.

It is an additional object of my invention to provide a matrix of the character set forth in the preceding paragraph which comprises a sheet formed by winding a flat interlocking ribbon spirally about itself.

Other objects and advantages of my invention will be apparent from a study of the following specifications, read in connection with the accompanying drawings, wherein.

Figure 2:
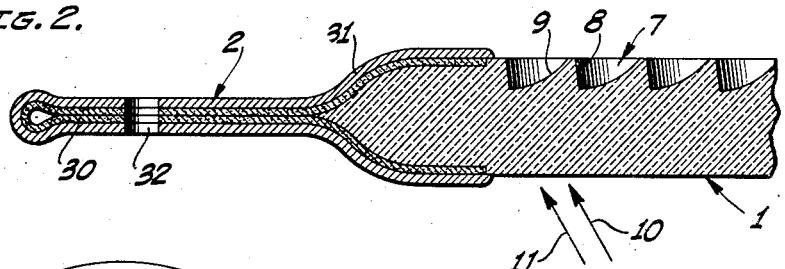
Fig. 2 is an enlarged fragmentary cross sectional view taken substantially along the line II—II of Fig. 1 illustrating in detail the mechanism by which the screen may be mounted in its frame and illustrating one type of spiral groove which may be provided in the screen face.
Figure 3:
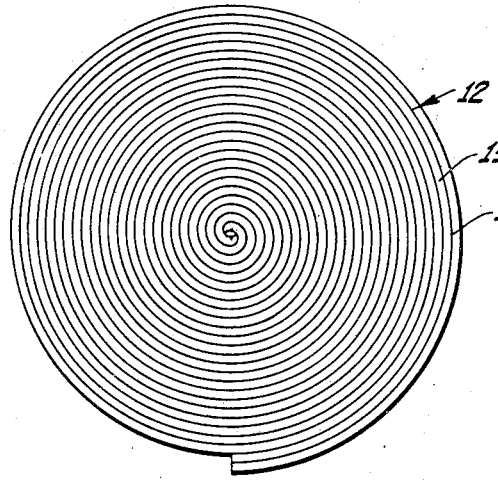
Fig. 3 is a plan view of a matrix core member upon which a suitable ribbon material may be wound to provide a spiral matrix.

Fig. 4 is an exploded perspective view illustrating the manner in which the end of the ribbon material may be secured to the core member which is illustrated in Fig. 3; and Fig. 5 is a fragmentary cross section similar to Fig. 2 but illustrating the manner in which the adjacent turns of ribbon material interlock with each other to provide a matrix upon which a liquid "Lucite" may be cast to provide a screen of the desired character.

Figure 1:
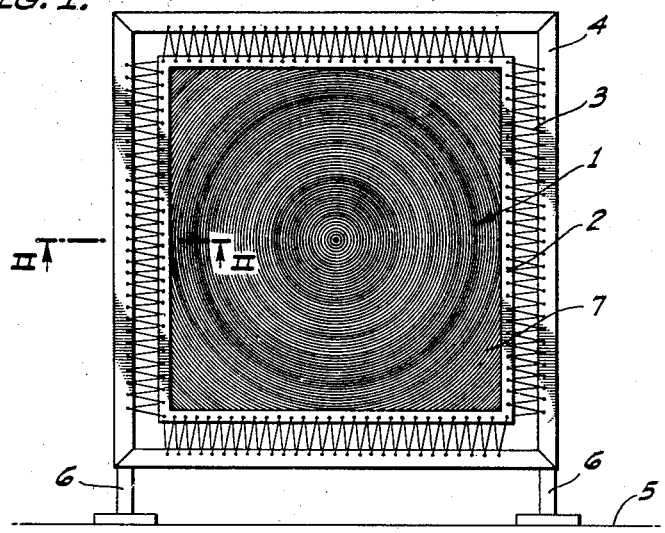
Fig. 1 is an elevational view illustrating the appearance of a light transmitting screen constructed by the matrix of my invention.

Referring to the drawings, I have illustrated in Fig. 1 one form of screen which may be constructed according to my invention. The screen includes a working surface or area 1 which is adapted to receive a picture projected upon the reverse side thereof by a suitable motion picture projector, which picture is ordinarily photographed by a motion picture camera disposed before the screen. The working area 1 is bounded by an integral border portion 2 which includes means cooperating with suitable lacings 3 to support the screen structure within any suitable supporting frame 4. The frame 4 is adapted to hold the screen in a substantially vertical plane and for this purpose may be suspended from suitable overhead supporting structure or may rest upon a supporting surface such as a floor 5 by means of feet or legs 6.

It has been found that if the screen 1 is made of a transparent plastic of the type known in the trade as "Lucite" and is provided on its front face with a series of concentric or spiral grooves 7 of the proper cross section to provide a step cut screen surface having a plurality of light refracting facets, light which is projected upon the back of the screen by a motion picture projector will be redirected by such facets into the objective of a camera disposed before the screen.

The cross section of the grooves 7 may be so chosen as to redirect substantially all of the light which falls upon the rear face of the screen, thus, in effect, forming a Fresnel type of lens. It has been found, however, that if the grooves 7 are so constructed, the motion picture projector which is disposed behind the screen and the camera which is disposed in front of the screen must be very carefully aligned with the axis of the lens formed by the screen and the distance between the screen and the projector and between the screen and the camera must be very carefully adjusted in terms of the effective focal length of the screen. For this reason it is preferred to make the grooves 7 of a cross section approaching those which may be employed in a true Fresnel type of lens but differing therefrom by a sufficient amount to avoid the aforementioned difficulties arising from the substantially optically perfect screen.

I accordingly prefer to form the grooves with a contour such as that illustrated in Fig. 2 comprising a substantially plane surface 8 which is disposed at a slight angle to a line normal to the screen surface so as to be directed generally towards the objective of the projector which is disposed behind the screen. The other face 9 of the groove 7 is preferably made curved in cross section, the lowermost part which defines the bottom of the groove 7 being disposed substantially parallel to the front face of the screen 1 and the part which intersects the front surface of the screen being disposed at a considerable angle thereto.

The angle at which the surface 9 intersects the front face of the screen is controlled by the camera and projector angle which is subtended by the screen, it being found that an angle of substantially 60° at the intersection of the face 9 with the front surface of the screen is sufficient to accommodate the total camera angle of approximately 40°.

It will be observed that with this construction, the light which is projected upon the rear surface of the screen by the motion picture projector will strike the screen at an angle somewhat in the fashion indicated by arrows 10 and 11 in Fig. 2. It will be observed that the direction of these arrows is substantially parallel to the direction of the plane face 8 so that substantially the entire screen surface which intersects the rays 10 and 11 is comprised of a multiplicity of light refracting facets comprising the curved surfaces 9. The rays 10 and 11 strike the curved surfaces 9 at an acute angle and are consequently refracted thereby, the amount of refraction depending upon the angle at which the rays 10 and 11 strike this surface.

It will be observed that the greater part of the light will strike this curved surface at such an angle as to cause it to be refracted in the proper direction to enter the lens of a camera disposed before the screen irrespective of whether the particular groove in question is located at the center of the screen or at the extreme edge thereof.

The screen, when lighted from behind and viewed from the position of the motion picture camera lens, appears to have a bright line of light wound in spiral fashion in the same manner as are the grooves 7. In order that the screen will appear as though uniformly lighted, I prefer to make the spacing between each of the grooves 7 extremely small as compared with the dimensions of the screen. It has been found that a center to center distance between each of the adjacent grooves 7 of less than $\frac{1}{16}$ of an inch gives excellent results. I have found that a screen of this type of almost any desired size may be conveniently constructed by molding or by casting a suitable liquid plastic upon a corrugated matrix surface and allowing the plastic to set or harden.

A novel and convenient way of forming such a matrix surface is illustrated in Figs. 3, 4 and 5. For this purpose, I prepare a matrix surface having a closely wound spiral ridge thereon, it having been found that a closely wound spiral very closely approaches the desired concentric arrangement. The spiral matrix may be readily formed by employing a core member 12 which has cut in the upper surface thereof a spiral groove 13, the cross section of which is so adjusted as to provide a spirally wound ridge 14 having the same cross section as the desired cross section of the groove 7. The outermost turn of the ridge 14 is preferably cut abruptly along the vertical plane passing through the center of the core piece 12 to provide an end face 15 such as that illustrated in Fig. 4. A corresponding and similar end 16 of a strip of ribbon material 17 may be placed in contact with the end 15 and secured to the body of the core member 12 by means of a pin 18.

The pin 18 may be passed through a hole 19 provided in the ribbon 17 and into a corresponding hole 20 provided in the edge of the core member 12. The ribbon material 17 is then wound about the core member 12 so as to form a continuation of the spiral ridge 14. It will be observed that the second turn of the ribbon material 17 covers the head of the pin 18 to prevent it from coming out of the holes 19 and 20 in which it is received so that after the ribbon 17 is wound one full turn it will remain secured to the core member 12. The ribbon 17 is then wound about the core member 12 in spiral fashion until a sheet having a diameter greater than the diagonal of the screen to be manufactured is thus formed.

The strip material 17 is preferably formed of a relatively soft metal having little, if any, resilience so that after it is wound in the spiral form it will not exert any great force in tending to straighten out and destroy such spiral shape. I have found that solder or a similar alloy composed chiefly of lead and tin provides the desired characteristics. The strip 17 may be provided with the required cross sectional contour in any suitable manner such as by rolling or extruding or drawing through dies.

I have found it desirable to provide a means for securing adjacent turns of the ribbon material 17 to each other to prevent relative movement between these turns. For this purpose I provide a recess 21 having a rectangular cross section and extending longitudinally the full length of the ribbon 17. The recess 21 is adapted to receive a corresponding tongue or ridge 22 formed upon the opposite face of the strip 17. It will be seen that as the strip is wound spirally, adjacent turns are held against relative movement by the tongue 22 entering the groove 21. The entire matrix surface thus formed may be secured to a flat supporting surface or table 23 by providing upon the lower edge of the ribbon a downwardly depending tongue portion 24 and by providing in this tongue portion at spaced intervals along the length of the strip 17 openings 25.

A wire 26 or similar securing means may be passed through the openings 25 and through suitable openings 27 provided in the table 23 so as to hold the entire matrix structure thereon. After the matrix has been assembled and secured to its supporting surface 23, the rough rectangular outline of the screen 1 may be defined by a temporary retaining wall 28 formed of wax, clay, or similar material. Within this retaining wall is then poured, sprayed or otherwise introduced a liquid plastic material 29 which is capable of air-setting or hardening. After the plastic material 29 has set, the retaining walls 28 may be destroyed and the entire sheet may be removed from the matrix surface.

The sheet thus formed will be roughly rectangular in shape and will have formed upon its front face the previously mentioned spiral grooves 7. The sheet may then be trimmed to the desired size and suspended for use in any suitable manner. I have found that a convenient way of suspending the screen 1 thus formed within the frame 4 is to employ the aforementioned border portion 2. This border may be formed in the manner indicated in Fig. 2 by taking a strip of canvas 30 or other similar strong and porous material and folding it back upon itself with one edge of the strip disposed upon the upper surface of the screen body and the other edge disposed upon the lower surface of the screen body. Liquid plastic material may then be poured over the canvas 30 to completely impregnate the same and to act as an adhesive to secure the canvas strip 30 to the screen 1. The application of pressure at the point where the canvas overlies the screen body will result in the canvas being imbedded therein so that there is formed a substantially integral border portion 2 comprising the canvas strip 30 impregnated with overlying layers 31 of plastic material. The border portion 2 then may be perforated at intervals along its length to provide openings 32 through which the lacings 3 may be passed.

It has been found that if the completed screen including the body portion 1 and the border portion 2 be slightly heated as by placing the assembly in the sun and then laced tightly within the frame 4 while in a heated condition, the subsequent lowering of the temperature will cause the screen to shrink and be pulled by the lacings 3 very tightly into a true plane surface.

From the foregoing, it will appear that I have provided a novel matrix for constructing a light transmitting screen which is very efficient and is capable of many and diverse applications in the motion picture industry. Furthermore, I have provided a novel matrix upon which liquid plastic material may be cast to provide such a screen.

While I have shown and described the preferred embodiment of my invention, I do not desire to be limited to any of the details of construction shown or described herein, except as defined in the appended claims.

I claim:

1. In a matrix for forming a light transmitting screen of the type employing a grooved screen surface defining a plurality of facets for refracting light received from a projector disposed on one side of said screen into a camera disposed on the other side thereof, the combination of: a matrix body comprising a thin metal tape wound in spiral fashion about itself, adjacent turns of said spiral lying in contact with each other, said tape having a pre-formed edge portion of a cross section congruent with said grooves for forming a matrix surface having a plurality of substantially concentric ridges thereon.

2. In a matrix for forming a light transmitting screen of the type employing a grooved screen surface defining a plurality of facets for refracting light received from a projector disposed on one side of said screen into a camera disposed on the other side thereof, the combination of: a matrix body comprising a thin metal tape wound in spiral fashion about itself, adjacent turns of said spiral lying in contact with each other; an edge portion on said tape having a cross section congruent with said grooves for forming a matrix surface having a plurality of substantially concentric ridges thereon; a longitudinally extending tongue formed on one side of said tape; and a longitudinally extending groove formed in the other side of said tape for receiving the tongue on an adjacent turn of said spiral to hold said adjacent turns against relative movement toward and away from said surface.

OTIS C. MARTIN.